United States Patent
Brezina et al.

(10) Patent No.: US 6,755,576 B2
(45) Date of Patent: Jun. 29, 2004

(54) MULTIPLE ARRAY OPTOELECTRONIC CONNECTOR WITH INTEGRATED LATCH

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/007,023

(22) Filed: Nov. 5, 2001

(65) Prior Publication Data

US 2003/0086659 A1 May 8, 2003

(51) Int. Cl.[7] .................................................. G02B 6/36
(52) U.S. Cl. ............................................. 385/88; 385/39
(58) Field of Search ............................... 385/88, 14, 31, 385/39, 53, 56, 73, 75

(56) References Cited

U.S. PATENT DOCUMENTS

| | | | |
|---|---|---|---|
| 4,198,119 A | * | 4/1980 | Uberbacher ................... 385/81 |
| 4,218,113 A | | 8/1980 | Uberbacher |
| 4,373,778 A | | 2/1983 | Adham |
| 4,427,879 A | * | 1/1984 | Becher et al. .............. 250/215 |
| 4,458,985 A | | 7/1984 | Balliet et al. |
| 4,553,813 A | | 11/1985 | McNaughton et al. |
| 4,598,974 A | | 7/1986 | Munn et al. |
| 4,934,778 A | | 6/1990 | Gillett |
| 5,093,879 A | | 3/1992 | Bregman et al. |
| 5,202,943 A | | 4/1993 | Carden et al. |
| 5,241,614 A | * | 8/1993 | Ecker et al. ................... 385/94 |
| 5,315,679 A | | 5/1994 | Baldwin et al. |
| 5,329,604 A | | 7/1994 | Baldwin et al. |
| 5,333,225 A | * | 7/1994 | Jacobowitz et al. .......... 385/93 |
| 5,337,388 A | | 8/1994 | Jacobwitz et al. |
| 5,396,573 A | | 3/1995 | Ecker et al. |
| 5,499,311 A | | 3/1996 | DeCusatis |
| 5,729,644 A | | 3/1998 | Shiflett et al. |
| 5,980,312 A | * | 11/1999 | Chapman et al. ......... 439/540.1 |
| 6,318,909 B1 | * | 11/2001 | Giboney et al. .............. 385/90 |
| 6,554,765 B1 | * | 4/2003 | Yarush et al. ............... 600/132 |

OTHER PUBLICATIONS

U.S. patent application entitled "External EMI Shield for Multiple Array Optoelectronic Devices", (Inventors Johnny R. Brezina, et al.

U.S. patent application entitled "Internal EMI Shield for Multiple Array Optoelectronic Devices", (Inventors Johnny R. Brezina, et al.

U.S. patent application entitled "Fiber Optic Transceiver, Connector, and Method of Dissipating Heat", (Inventors Johnny R. Brezina, et al.

* cited by examiner

*Primary Examiner*—Frank G. Font
*Assistant Examiner*—Kevin C Kianni
(74) *Attorney, Agent, or Firm*—Cardinal Law Group; Casimer K. Salys

(57) ABSTRACT

An optical fiber link module comprises an upper connector and a lower portion. The upper connector comprises metal, and the lower portion is connected to the upper connector. The lower portion has a pair of arms for retaining a fiber optic cable.

12 Claims, 2 Drawing Sheets

MULTIPLE ARRAY OPTOELECTRONIC CONNECTOR WITH INTEGRATED LATCH

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. (IBM Docket No. AUS920010689US1);

"External EMI Shield For Multiple Array Optoelectronic Devices", by Johnny R. Brezina, et al. (IBM Docket No. AUS920010690US1);

"Packaging Architecture For A Multiple Array Transceiver Using A Continuous Flexible Circuit", by Johnny R. Brezina, et al. (IBM Docket No. AUS920010591US1);

"Flexible Cable Stiffener for An Optical Transceiver", by Johnny R. Brezina, et al. (IBM Docket No. AUS920010729US1);

"Enhanced Folded Flexible Cable Packaging for Use in Optical Transceivers, by Johnny R. Brezina, et al. (IBM Docket No. AUS920010727US1);

"Apparatus and Method for Controlling an Optical Transceiver", by Johnny R. Brezina, et al. (IBM Docket No. AUS920010728US1);

"Internal EMI Shield for Multiple Array Optoelectronic Devices", by Johnny R. Brezina, et al. (IBM Docket No. AUS920010730US1);

"Mounting a Lens Array in a Fiber Optic Transceiver", by Johnny R. Brezina, et al. (IBM Docket No. AUS920010733US1);

"Packaging Architecture for a Multiple Array Transceiver Using a Flexible Cable", by Johnny R. Brezina, et al. (IBM Docket No. AUS920010734US1);

"Packaging Architecture for a Multiple Array Transceiver Using a Flexible Cable and Stiffener for Customer Attachment", by Johnny R. Brezina, et al. (IBM Docket No. AUS920010735US1);

"Packaging Architecture for a Multiple Array Transceiver Using a Winged Flexible Cable for Optimal Wiring", by Johnny R. Brezina, et al. (IBM Docket No. AUS920010736US1); and "Horizontal Carrier Assembly for Multiple Array Optoelectronic Devices", by Johnny R. Brezina, et al. (IBM Docket No. AUS920010763US1).

TECHNICAL FIELD OF THE INVENTION

This invention relates generally to optoelectronic ports, and more particularly to a multiple array optoelectronic connector with an integrated latch.

BACKGROUND OF THE INVENTION

Optical fiber is widely used to rapidly and reliably transfer data between computer systems. In general, an optical fiber includes a core region that is coated by an annular clad. The core region has an index of refraction greater than that of the clad, so that light is transmitted through the core by total internal refraction. Optical fibers transmit data from an optoelectronic transducer, such as a laser or Light Emitting Diode (LED), to an optoelectronic receiver that generates electrical information based upon the signal received.

The fibers are typically either threaded onto the optoelectronic components or latched by the use of connectors such as MTP or MTO connectors. In the latter instance, the connectors are usually plastic in order to accommodate the flexible elements necessary to establish a workable latch. Most array optical devices have relatively high thermal densities. Plastic is a relatively poor thermal conductor, however, and therefore does not maximize the removal of heat generated by the optoelectronic components.

SUMMARY OF THE INVENTION

The present invention is an optical fiber link module. The optical fiber link module comprises an optical fiber, a heat sink, and a metallic upper connector. The upper connector is integral with the heat sink and in electrical communication therewith. A lower portion is connected to the upper connector, and is adapted to receive the optical fiber. The lower portion has a pair of flexible arms for retaining the fiber optic cable.

It is an object of the present invention to provide an optical fiber link module of the type described above that has increased cooling efficiency.

Another object of the present invention is to provide an optical link module of the type described above that implements flexible snap lock arms within a cast metal connector housing.

Still another object of the present invention is to provide an optical link module of the type described above that is simple, compact, and cost effective.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION OF THE INVENTION

Figure 1:
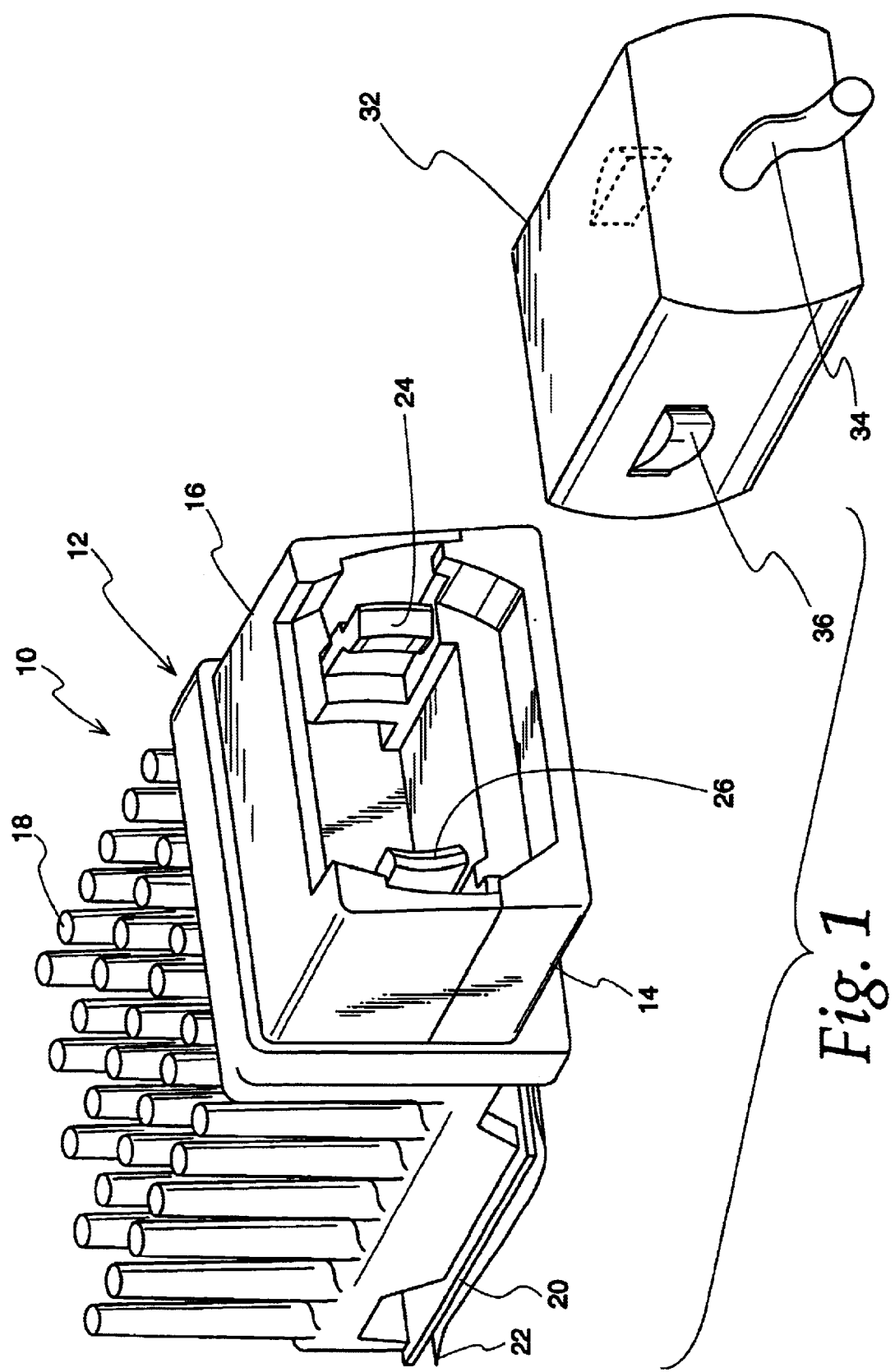
FIG. 1 is a perspective view showing an optical link module according to the present invention.

FIG. 1 shows the general configuration of an exemplary optical link module 10 according to the present invention. Optical link module 10 represents a fiber optic communications package which is mounted within a component such as a router that transfers data to and from another component of the router or other computer systems such as network servers, mid-range computers, mainframe computers, work stations, desktop computers, portable computers, and the like. The optical link module 10 generally includes an upper portion 12 and a lower portion 14. The upper portion 12 is preferably die cast as a single piece of a relatively high thermal conductivity material such as aluminum, and includes an upper connector 16 and a heat sink 18.

An aluminum stiffener 20 is provided on the underside of the heat sink 18, with a flexible circuit 22 attached thereto.

The flexible circuit may carry integrated circuit chips, resistors and other structure which operate to convert and route the fiber optic light signals from the fiber to and from other areas of the router of which the module 10 is a part. Although the details of such conversion and routing are considered to be well within the level of ordinary skill in the art, further information is available in U.S. Pat. No. 6,085,006, the disclosure of which is hereby incorporated by reference. Normally, the module 10 receives serial electrical signals from a CPU, and an emitter (which may be an LED or laser) converts the serial electrical signal to a serial optical signal for transmission through the optical fiber. The module may also receive parallel electrical signals from the CPU, and convert the parallel electrical signal to a serial electrical signal that is provided to the emitter. The emitter in turn converts the serial electrical signal to a serial optical signal for transmission through the fiber. Similarly, incoming serial optical signals are converted by a receiver (which may be a photodiode) to a serial electrical signal. The serial electrical signal may be output to the CPU as a serial signal or converted to a parallel electrical signal and transmitted to the CPU. The emitter and the receiver may also transmit a parallel signal, in which case it is possible to omit the parallel to serial conversion or it may be possible to convert a serial electrical signal to a parallel signal for parallel optical transmission. In a preferred embodiment, signals are transmitted over the optical fibers at a frequency of about 2.5 gigahertz.

Figures 2, 3:
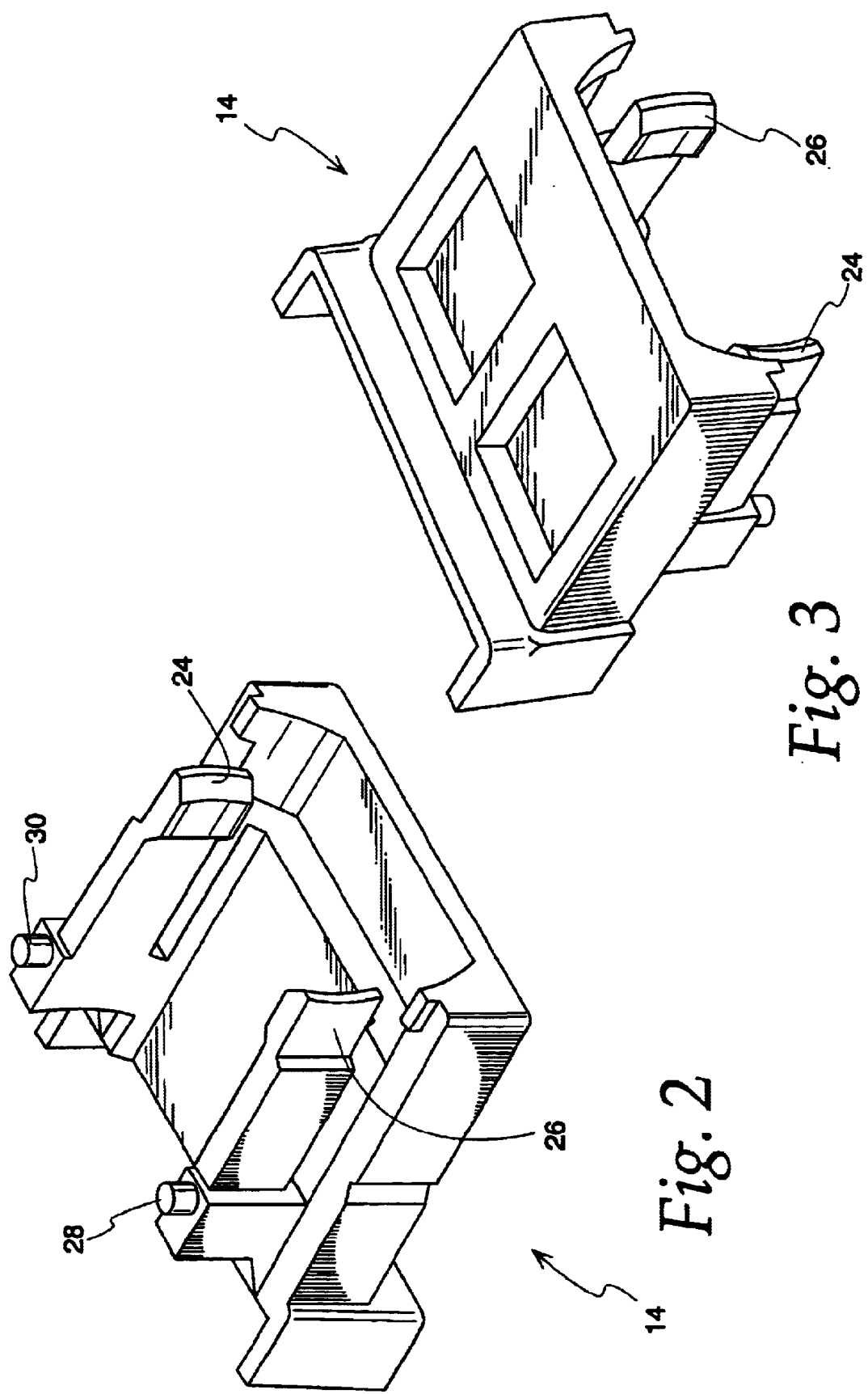
FIG. 2 is a perspective view of a lower connector portion of the optical link module.
FIG. 3 is a perspective view of the underside of the lower connector portion.

As best shown in FIGS. 2 and 3, the lower portion 14 of the module 10 is a separate, molded thermoplastic piece having a pair of retention arms 24 and 26. Locating pins 28 and 30 project upwardly from the lower portion 14, and aid in locating the lower portion 14 against the upper connector portion 16. The upper and lower portions of the connector housing may be joined in any known manner, or may be joined with an external EMI shield such as that disclosed in U.S. patent application Ser. No. 10/006,644, entitled External EMI Shield For Multiple Array Optoelectronic Devices, the disclosure of which is hereby incorporated by reference. The optical module 10 may additionally or alternatively be provided with an internal EMI shield such as that disclosed in U.S. patent application Ser. No. 10/006,834, entitled Internal EMI Shield For Multiple Array Optoelectronic Devices, the disclosure of which is also hereby incorporated by reference. In general, such shields are fabricated from a thin sheet of a metal, and function to inhibit the propagation of EMI radiation from the optical module 10.

Together, the upper connector 16 and the lower portion 14 form a female part of a standard MTP or MTO connector adapted to receive a male part 32 situated on the distal end of a fiber optic cable 34, as shown in FIG. 1. In a preferred embodiment, the male end of the fiber includes a multiple array similar to that shown in U.S. Pat. No. 5,499,311, the disclosure of which is hereby incorporated by reference. In general, the male part 32 is provided with detent ridges 36 that displace the retention arms 24 and 26 upon insertion, and then removably lock the male part within the female connector formed by the upper and lower connector housings 16 and 14.

During use, the multiple array optoelectonic components of the module 10 generate heat. The upper connector housing 16 acts as a thermal sink, and aids in the removal of heat from the internal components of the optical array device by communicating the heat to the heat sink 18. In a preferred embodiment, the module 10 is cooled using forced air. Thermal energy flows from the hot electronics to the top 16 of the retainer housing, which is in the cooling airflow path. Heat is thus efficiently removed from the device, while at the same time the connector of the module 10 is flexible enough to accommodate the snap-on retainer for the cable connector 32.

These features are achieved in a relatively simple, compact, and cost effective method. It should be appreciated that the optical link module is suitable for use in other communications systems or optical transmission networks, such as those used in telephone service. Various other modifications may be made to the illustrated embodiments without departing from the spirit and scope of the invention. Therefore, the invention lies solely in the claims hereinafter appended.

What is claimed is:

1. An optical fiber link module, comprising:
   an optical fiber cable with a receiver for engaging with arms;
   a heat sink;
   a metallic upper connector integral with the heat sink and in electrical communication therewith;
   a lower portion connected to the upper connector and adapted to retain the optical fiber cable, the lower portion having a pair of flexible arms for engaging the receiver on fiber optic cable.

2. The optical fiber link module of claim 1 wherein the lower portion comprises plastic.

3. The optical fiber link module of claim 1 wherein the upper portion comprises aluminum.

4. The optical fiber link module of claim 1 wherein the optical fiber is removable from the flexible arms.

5. The optical fiber link module of claim 1 wherein the upper connector and the lower portion form an MTP connector.

6. The optical fiber link module of claim 1 wherein the upper connector and the lower portion form an MTO connector.

7. An optical fiber link module, comprising:
   an upper portion including an upper connector and an integral heat sink, the upper portion comprising a high thermal density metal;
   a plastic lower portion connected to the upper connector, the lower portion having a pair of flexible arms; and
   a fiber optic cable engaged with the arms.

8. The optical fiber link module of claim 7 wherein the upper connector comprises aluminum.

9. The optical fiber link module of claim 7 wherein the fiber optic cable is removable from the flexible arms.

10. The optical fiber link module of claim 7 wherein the upper connector and the lower portion form an MTP connector.

11. The optical fiber link module of claim 7 wherein the upper connector and the lower portion form an MTO connector.

12. The optical fiber link module of claim 7 wherein the fiber optic cable is removable from the flexible arms.

* * * * *